US009826429B2

United States Patent
Smadi et al.

(10) Patent No.: US 9,826,429 B2
(45) Date of Patent: *Nov. 21, 2017

(54) JOINT WLAN POWER AND RATE CONTROL TO MITIGATE CO-LOCATED LTE TDD INTERFERENCE

(71) Applicant: BlackBerry Limited, Waterloo (CA)

(72) Inventors: Mohammed Nawaf Smadi, Ancaster (CA); Ghada Badawy, Burlington (CA)

(73) Assignee: BlackBerry Limited, Waterloo, Ontario (CA)

( * ) Notice: Subject to any disclaimer, the term of this patent is extended or adjusted under 35 U.S.C. 154(b) by 0 days.

This patent is subject to a terminal disclaimer.

(21) Appl. No.: 15/131,815

(22) Filed: Apr. 18, 2016

(65) Prior Publication Data

US 2016/0309358 A1 Oct. 20, 2016

Related U.S. Application Data

(63) Continuation of application No. 14/166,535, filed on Jan. 28, 2014, now Pat. No. 9,319,926.

(51) Int. Cl.
*H04W 28/02* (2009.01)
*H04W 16/14* (2009.01)
(Continued)

(52) U.S. Cl.
CPC .......... *H04W 28/0236* (2013.01); *H04L 5/14* (2013.01); *H04L 5/1469* (2013.01); *H04W 16/14* (2013.01);
(Continued)

(58) Field of Classification Search
CPC ............................................... H04W 28/0236
See application file for complete search history.

(56) References Cited

U.S. PATENT DOCUMENTS

| 5,212,684 A | 5/1993 | MacNamee et al. |
| 2009/0258607 A1 | 10/2009 | Beninghaus et al. |

(Continued)

FOREIGN PATENT DOCUMENTS

| WO | 2010/111648 | 9/2010 |
| WO | 2013/062643 | 5/2013 |

OTHER PUBLICATIONS

Ginzburg and Kesselman, "Performance analysis of A-MPDU and A-MSDU aggregation in IEEE 802.11n," Sarnoff Symposium, 2007 IEEE, Apr. 30-May 2, 2007, 5 pages.

(Continued)

*Primary Examiner* — Brian D Nguyen
*Assistant Examiner* — Toan Nguyen
(74) *Attorney, Agent, or Firm* — Fish & Richardson P.C.

(57) ABSTRACT

In some implementations, a method of a wireless local area network (WLAN) transmitter includes, in response to interference with a long term evolution (LTE) receiver, determining a de-sense value of the LTE receiver; determining a transmission rate for the WLAN transmitter, the transmission rate requiring an equal or lower receiver sensitivity than a received signal strength threshold; determining a frame aggregation size based on the transmission rate and an LTE frame configuration for the LTE receiver; determining a transmission power based on the de-sense value; and transmitting data during a downlink receiving period of the LTE receiver using the transmission rate, the frame aggregation size, and the transmission power.

14 Claims, 4 Drawing Sheets

(51) Int. Cl.
*H04W 52/24* (2009.01)
*H04W 72/08* (2009.01)
*H04L 5/14* (2006.01)
*H04W 52/18* (2009.01)
*H04W 72/04* (2009.01)
*H04W 88/06* (2009.01)
*H04W 84/12* (2009.01)

(52) U.S. Cl.
CPC ....... *H04W 28/0231* (2013.01); *H04W 52/18* (2013.01); *H04W 52/243* (2013.01); *H04W 72/0446* (2013.01); *H04W 72/082* (2013.01); *H04W 84/12* (2013.01); *H04W 88/06* (2013.01)

(56) References Cited

U.S. PATENT DOCUMENTS

| | | | |
|---|---|---|---|
| 2012/0147858 A1* | 6/2012 | Wang | H04W 16/14 370/336 |
| 2013/0155884 A1* | 6/2013 | Wang | H04W 72/1215 370/252 |
| 2013/0324113 A1 | 12/2013 | Jechoux et al. | |
| 2014/0126666 A1 | 5/2014 | Goldsmith et al. | |
| 2014/0185494 A1* | 7/2014 | Yang | H04W 56/0005 370/280 |
| 2014/0254408 A1 | 9/2014 | Shukla et al. | |
| 2014/0273884 A1 | 9/2014 | Mantravadi et al. | |
| 2015/0043440 A1* | 2/2015 | Ko | H04W 74/04 370/329 |
| 2015/0098451 A1* | 4/2015 | Belghoul | H04W 72/1215 370/336 |

OTHER PUBLICATIONS

Poole, 'Radio-Electronics.com' [online], "LTE Frame and Subframe Structure," [retrieved on Mar. 5, 2015]. Retrieved from the Internet: URL<http://www.radio-electronics.com/info/cellulartelecomms/lte-long-term-evolution/lte-frame-subframe-structure.php>, 5 pages.

"3GPP TR 36.816 V11.2.0," Technical Specification Group Radio Access (E-UTRA), "Study on Signalling and Procedures for Interference Avoidance for In-Device Coexistence (Release 11)," Dec. 2011, 44 pages.

Extended European Search Report in European Application No. 15152609.2, dated Jun. 12, 2015, 7 pages.

Communication Pursuant to Article 94(3) EPC issued in European Application No. 15152609.2 dated May 2, 2017.

* cited by examiner

JOINT WLAN POWER AND RATE CONTROL TO MITIGATE CO-LOCATED LTE TDD INTERFERENCE

CROSS REFERENCE TO RELATED APPLICATION

This patent is a continuation of U.S. application Ser. No. 14/166,535, filed Jan. 28, 2014, now U.S. Pat. No. 9,319,926, the entire contents of which is hereby expressly incorporated by reference herein in its entireties.

FIELD

This disclosure relates to interference management for Long Term Evolution (LTE) and wireless local area network (WLAN, also known as "WiFi") systems.

BACKGROUND

Multiple wireless communication networks (e.g., cellular network, WLAN network, Bluetooth network, etc.) can be co-located. The multiple communication networks can provide services to user devices located in respective serving areas. In some instances, a user device can receive services from and access to two or more communication networks when the device is located within the coverage areas of the two or more communication systems. As an example, a mobile device located inside or in the vicinity of a building may receive both cellular coverage of an LTE network and WiFi coverage of a WLAN network installed in the building. The user device can establish phone calls via the LTE network and access the Internet via the WLAN network or the LTE network. In other cases, some services will be tied to a particular network (e.g. private network, or a carrier app store, etc. . . . ).

DETAILED DESCRIPTION

The present disclosure is directed to interference management to mitigate interference between WLAN and LTE systems. For example, example techniques and systems are disclosed to jointly control transmission power and rate of a WLAN transmitter to mitigate inference to co-located LTE TDD systems. In some instances, some of the LTE time division duplex (TDD) bands (e.g. B40, B41) have limited or no guard band with the ISM 2.4 GHz band that can be used by the WLAN system. Depending on the LTE transmission (TX) power spectral density, some LTE transmissions may jam the WLAN receiver partially or completely and prevent the reception of WLAN downlink (DL) traffic. On the other hand, depending on the WLAN transmit power and the frame duration, the WLAN transmissions may jam the LTE receiver. To minimize the probability of both radios jamming each other, some implementations silence the WLAN radio during LTE receiving (RX) periods and only allow operation of the LTE radio. In some other implementations, concurrent operations of the WLAN and LTE radios can be achieved. Example techniques and systems are disclosed for joint WLAN TX power and rate control with awareness of the LTE-TDD frame configuration. The example techniques and systems can reduce or prevent performance degradation due to suspending WLAN operation and allow concurrent operation of LTE and WLAN transceivers without LTE RX de-sensing.

In some implementations, transmission power of the WLAN transmitter can be reduced to reduce interference to the LTE receiver, thus reducing or minimizing the de-sensing of the LTE receiver. For example, a de-sense value of the LTE receiver can be identified. The reduced (or new) WLAN transmission power can be a regular (or current) WLAN TX power (e.g., during normal WLAN transmission without concurrent operations with the LTE transceiver) minus the de-sense value of the LTE receiver. The WLAN TX power reduction can cause a decrease in signal-to-interference-plus-noise ratio (SINR) at the WLAN receiver. For instance, the received signal strength at the WLAN receiver may be the regular received signal strength (e.g., corresponding to the regular WLAN TX power) minus the de-sense value of the LTE receiver. The WLAN TX power and received signal strength can be determined in another manner and can depend on additional or different factors.

To accommodate the SINR decrease at the WLAN receiver, the WLAN transmitter can select lower, more resilient, physical layer (PHY) data rate (or transmission rate). In some instances, for certain LTE TDD frame configurations, higher WLAN throughput is achievable by using continuous WLAN operation at lower data rates than intermittent WLAN operation at high data rate.

The example techniques can identify the highest WLAN uplink (UL) data rate that can ensure proper operation at the WLAN receiver with available SINR while allowing for concurrent LTE-TDD and WLAN operations. In some instances, the highest WLAN UL data rate allowing for concurrent operation is selected for transmission, instead of aggressively selecting the lowest possible WLAN data rate (e.g. 6 Mbps). For example, a (new) WLAN UL data rate can be selected such that it requires an equal or less receiver sensitivity than a received signal strength threshold. The received signal strength threshold can be based on, for example, the received signal strength using the reduced WLAN TX power that takes into account the LTE receiver de-sensing. As one example, the received signal strength threshold can be the regular received signal strength minus the de-sense value of the LTE receiver. As another example, the received signal strength threshold can be a receiver sensitivity (e.g., corresponding to using a regular (or current) WLAN data rate with the regular WLAN TX power) minus the de-sense value of the LTE receiver. The received signal strength threshold can be determined in another manner and can be based on additional or different factors.

In some implementations, the example techniques take into consideration frame aggregation (e.g., Aggregation of MAC protocol data units (A-MPDU)) that is available in IEEE 802.11n and 802.11ac. The example techniques examine the impact of a well behaved interferer such as LTE TDD on IEEE 802.11n aggregation. For example, a maximum frame aggregation size for UL WLAN data transmission can be determined. In some implementations, the maximum frame aggregation size can be determined such that an aggregated WLAN frame with the maximum frame aggregation size can fit within a LTE TDD frame or one or more subframes. For instance, a maximum frame aggregation size using the regular (or current) WLAN data rate with the regular WLAN TX power can be determined such that the corresponding aggregated WLAN frame has a transmission duration less than or equal to the LTE transmission period (e.g., during one or more LTE TDD UL subframes). In another example, a maximum frame aggregation size using the new WLAN data rate with the reduced (or new) WLAN TX power can be determined such that the corresponding WLAN frame has a transmission duration less than or equal to the whole LTE transmission period (e.g., includes both LTE TDD UL subframes and DL subframes). The maximum frame aggregation size can depend on device capability (e.g., available buffers) or other factors.

In some implementations, given a determined frame aggregation size, corresponding transmission efficiency and throughput can be determined. For example, a regular throughput for the WLAN transmitter (e.g., without concurrent WLAN and LTE operations) can be based on a product of the regular WLAN data rate and the efficiency determined based on the frame aggregation size of the regular WLAN data rate. Similarly, a new throughput for the WLAN transmitter with concurrent WLAN and LTE operations can be based on a product of the new WLAN data rate and the efficiency determined based on the frame aggregation size of the new WLAN data rate. The regular throughput and the new throughput can be compared. The WLAN transmitter can use the new data rate, the new transmission power, and the corresponding frame aggregation size for data transmission during LTE receiving period if the new throughput is equal to or larger than the regular throughput. Otherwise, the WLAN transmitter can use the regular data rate, the regular transmission power, and the corresponding frame aggregation size for data transmission during LTE UL transmitting period.

In some implementations, the frame aggregation size can be determined based on 3-wire (LTE_TX, LTE_RX, WLAN_PRIO). LTE_TX indicates the beginning of LTE_TX (it could be slightly offset from the actual transmission event to given enough time for WLAN to change its behaviour. In some implementations, the assertion of this line may be qualified/filtered such that it is only asserted if there is a high probability that the impending LTE TX will indeed interfere with occurring/expected WLAN RX). LTE_RX is similar to LTE_TX but for LTE receptions. For WLAN_PRIO, usually WLAN is assumed to be of lower priority and it may be gracefully or abruptly silenced. However, some WLAN traffic (e.g. Beacons) need to be received/transmitted else the WLAN connection may be lost (i.e. compared to say a degradation in WLAN TP). Protecting this kind of crucial traffic may take precedence over regular LTE traffic. The presence of such traffic is indicated by the WLAN_PRIO line. Now, if the WLAN is trying to abuse this line (e.g., assert it all the time), then the LTE may start to ignore or only honor a certain number of requests. In some other implementations, the example techniques can make use of the LTE TDD frame configuration exchanged over the Bluetooth Special Interest Group (SIG) (BT-Sig) 2 interface instead of relying on the 3-wire (LTE_TX, LTE_RX, WLAN_PRIO) for determining proper frame aggregation size for WLAN transmission. The example techniques and systems described in this disclosure may provide additional or different advantages.

Figure 1:
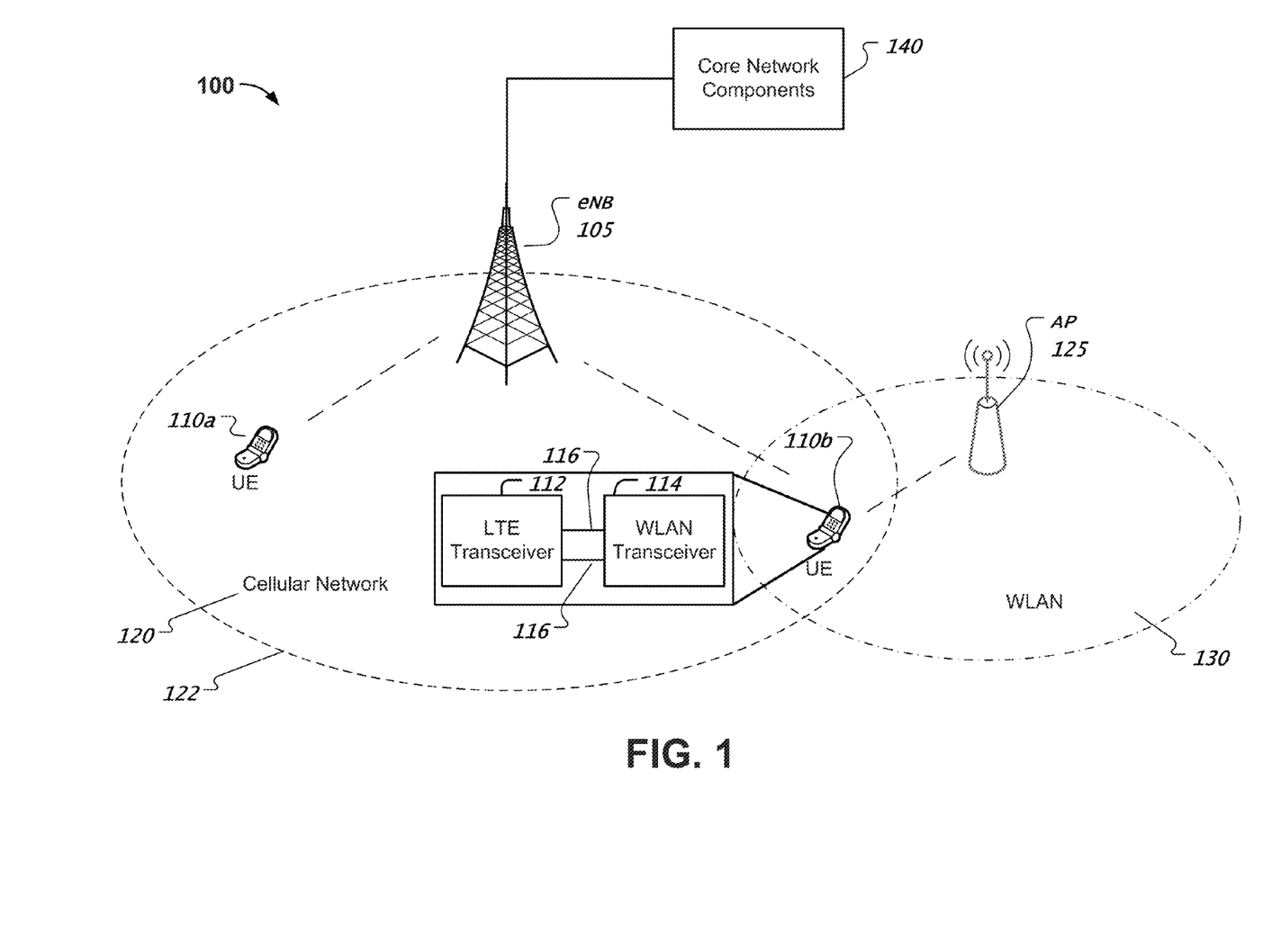
FIG. 1 is an example wireless communication system.

FIG. 1 is an example wireless communication system 100. As illustrated, the wireless communication system 100 includes a cellular network 120 and a WLAN network 130. The cellular network 120 and the WLAN network 130 may communicate based on orthogonal frequency division multiplexing (OFDM), orthogonal frequency division multiple access (OFDMA), space-division multiplexing (SDM), frequency-division multiplexing (FDM), time-division multiplexing (TDM), code division multiplexing (CDM), or others. Communications within the cellular network 120 may be transmitted in accordance with Long Term Evolution (LTE), Global System for Mobile Communication (GSM) protocols, Code Division Multiple Access (CDMA) protocols, Universal Mobile Telecommunications System (UMTS), Unlicensed Mobile Access (UMA), or others.

The wireless communication system 100 can include one or more network nodes (e.g., 105 and 125) and one or more user equipment (UE, e.g., 110a and 110b). The network nodes may take several forms in a mobile communication system, such as (but not limited to) an evolved Node B (eNB), a base station, a Node B, a wireless access point, a radio network controller, a base transceiver station, a layer two relay node, a layer three relay node, a femto cell, home eNB (HeNB), a home Node B (HNB), a base station controller, or other network node that includes radio resource control (RRC). In the illustrated example, the cellular network 120 can be an LTE network and the network node 105 can be an eNB. The network node 125 of the WLAN network 130 can be a wireless access point (AP). The wireless communication system and its components can be different in another implementation.

In some implementations, the wireless communication system 100 can also include one or more 2G/3G systems based on, for example, a Global System for Mobile communication (GSM), Interim Standard 95 (IS-95), Universal Mobile Telecommunications System (UMTS), or a CDMA2000 (Code Division Multiple Access). The cellular network 120 is connected to core network components 150. In some implementations, the cellular network 120 and the core network components 150 can include one or more radio access networks (e.g., an evolved-UMTS terrestrial radio access networks (E-UTRAN)), core networks (e.g., evolved packet cores (EPCs)), or external networks (e.g., IP networks).

The cellular network 120 can support and implement LTE standard and serve one or more user equipment (e.g., UEs 110a and 110b) within its coverage range (also known as coverage area, service area, etc.). For example, the cell 122 may represent the coverage area of eNB 105. UEs 110a and 110b are located within in the cell 122 and are served by eNB 105. The UEs 110a and 110b may be any electronic device used by an end-user to communicate, for example, within the wireless communication system 100. The UEs may transmit voice data, video data, user data, application data, multimedia data, text, web content and/or any other content.

In some implementations, the UES 110a and 110b and the eNB 105 can operate under a time-division duplexing (TDD) or a frequency-division duplexing (FDD) mode. Depending on the operating mode and standard, different radio resources (e.g., frequency bands) can be allocated for communications between a network node and UE. For instance, Table 1 shows an example frequency allocation for TDD LTE. For example, spectrum around 1.9 GHz, 2.3-2.7 GHz, and 3.5 GHz can be assigned to TDD LTE. The assigned spectrum can be further divided into multiple frequency bands (or sub-bands) and each band can have a respective bandwidth and central frequency occupying a respective radio frequency range. For example, Bands 40 and 41 are allocated with spectrum around 2.4 GHz. The radio frequency resources can be allocated similarly or differently for another operating mode (e.g., FDD mode) or another communication standard (e.g., 2G, 3G, or 4G standard).

TABLE 1

TDD LTE Frequency Bands and Frequencies

| LTE BAND NUMBER | ALLOCATION (MHZ) | WIDTH OF BAND (MHZ) |
|---|---|---|
| 33 | 1900-1920 | 20 |
| 34 | 2010-2025 | 15 |
| 35 | 1850-1910 | 60 |
| 36 | 1930-1990 | 60 |
| 37 | 1910-1930 | 20 |
| 38 | 2570-2620 | 50 |
| 39 | 1880-1920 | 40 |
| 40 | 2300-2400 | 100 |
| 41 | 2496-2690 | 194 |
| 42 | 3400-3600 | 200 |
| 43 | 3600-3800 | 200 |

The WLAN network 130 can support and implement IEEE 802.11 standards (e.g., IEEE 802.11a, b, g, n, ac, ad, af) and provide network access to a wireless device (e.g., UE 110b) within its coverage range. The AP 125 serves as the network node of the WLAN 130 that allows the wireless device (e.g., UE 110b) to access to, for example, other wired or wireless network (e.g., Internet). Depending on the supported standard, the WLAN network 130 can use, for example, 2.4 GHz, 3.7 GHz, 5 GHz, 60 GHz frequency bands. For instance, IEEE 802.11b, 802.11g, 802.11n standards specify 2.4 GHz ISM band. The WLAN network 130 supporting IEEE 802.11b/g/n can use 2.4 GHz ISM band for transmission.

As illustrated in the FIG. 1, the LTE network 120 and the WLAN network 130 can be co-located and can have overlapping coverage area. UE (e.g., UE 110b) located in the overlapping coverage area of the cellular network 120 and the WLAN network 130 can access to and receive services from both networks. The UE 110b can include an LTE transceiver 112 and a WLAN transceiver 114 for transmission based on LTE and WLAN protocols, respectively. The two transceivers 112 and 114 can be connected via one or more interfaces 116. The interfaces can be, for example, BT-Sig 2 interface, or other appropriate interfaces.

Although FIG. 1 shows the two transceivers 112 and 114 as separated modules, in some implementations, they can be integrated together or they can share some or all hardware or software components. In some implementations, each transceiver (or radio) can include a transmitter, a receiver, and other appropriate circuitry or components. For example, the LTE transceiver can include an LTE transmitter and an LTE receiver that are configured to transmit and receive data based on the LTE standard, for example, in TDD or FDD mode. Similarly, a WLAN transceiver can include a WLAN transmitter and a WLAN receiver that are configured to transmit and receive data based on the WLAN standard (e.g., IEEE 802.11n).

In some instances, the LTE network 120 and the WLAN network 130 can both operate on or near 2.4 GHz ISM band and may cause interference to each other. For example, the WLAN receiver of the UE 110b may receive interference from the LTE transmitter of the UE 110b; and the LTE receiver of the UE 110b may receive interference from the WLAN transmitter of the UE 110b. In some implementations, the UE 110b can have concurrent operations of the LTE transceiver 112 and WLAN transceiver 114 without silencing one transmitter to protect reception of another receiver, for example, based on example techniques described with respect to FIG. 4, or another technique.

In general, the UE 110a or 110b may be referred to as mobile electronic device, user device, mobile station, subscriber station, portable electronic device, mobile communications device, wireless modem, or wireless terminal. The term "UE" can also refer to any hardware or software component that can terminate a communication session for a user. In addition, the terms "user equipment," "UE," "user equipment device," "user agent," "UA," "user device," and "mobile device" can be used synonymously herein.

Examples of a UE (e.g. UE 110a or 110b) may include a cellular phone, personal data assistant (PDA), smart phone, laptop, tablet personal computer (PC), pager, portable computer, portable gaming device, wearable electronic device, or other mobile communications device having components for communicating voice or data via a mobile communication network. Other examples include, but are not limited to, a television, a remote controller, a set-top box, a computer monitor, a computer (including a tablet, a desktop computer, a handheld or laptop computer, a netbook computer), a microwave, a refrigerator, a stereo system, a cassette player or recorder, a DVD player or recorder, a CD player or recorder, a VCR, an MP3 player, a radio, a camcorder, a camera, a digital camera, a portable memory chip, a washer, a dryer, a washer/dryer, a copier, a facsimile machine, a scanner, a multi-functional peripheral device, a wristwatch, a clock, and a game device, etc. The UE may include a device and a removable memory module, such as a Universal Integrated Circuit Card (UICC) that includes a Subscriber Identity Module (SIM) application, a Universal Subscriber Identity Module (USIM) application, or a Removable User Identity Module (R-UIM) application. Alternatively, the UE may include the device without such a module.

Figure 2:
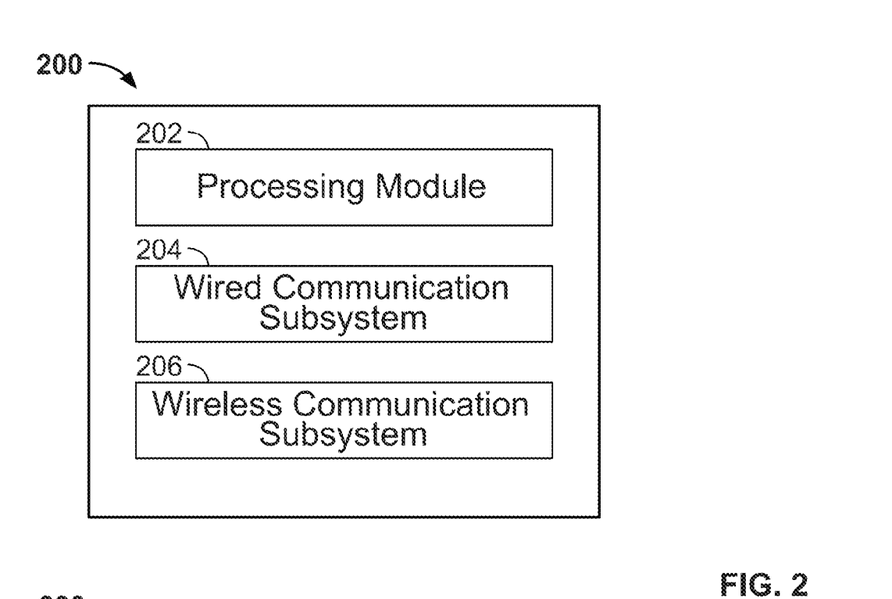
FIG. 2 is a schematic illustrating an example network node.

FIG. 2 is a schematic illustrating an example network node 200. As mentioned with regard to FIG. 1, the example network node 200 may be an example of the eNodeB 105 of the cellular network 120 or the AP 125 of the WLAN network 130. The network node 200 can transmit and receive signals to one or more user equipment based on various communication protocols. As an example, the network node 200, as an eNodeB of an LTE network, can support and implement LTE protocols. As another example, the network node 200 can support and implement IEEE 802.11 protocols as an AP for a WLAN network. The example network node 200 includes a processing module 202, a wired communication subsystem 204, and a wireless communication subsystem 206. The processing module 202 can include one or more processing components (alternatively referred to as "processors" or "central processing units" (CPUs)) operable to execute instructions associated with one or more of the processes, steps, or actions described above in connection with one or more of the implementations disclosed herein (for example, the operations described with respect to FIG. 4). The processing module 202 can also include other auxiliary components, such as random access memory (RAM), read only memory (ROM), or secondary storage (for example, a hard disk drive or flash memory). The processing module 202 can execute certain instructions and commands to provide wireless or wired communication, using the wired communication subsystem 204 or a wireless communication subsystem 206. A skilled artisan will readily appreciate that various other components can also be included in the example network node 200.

Figure 3:
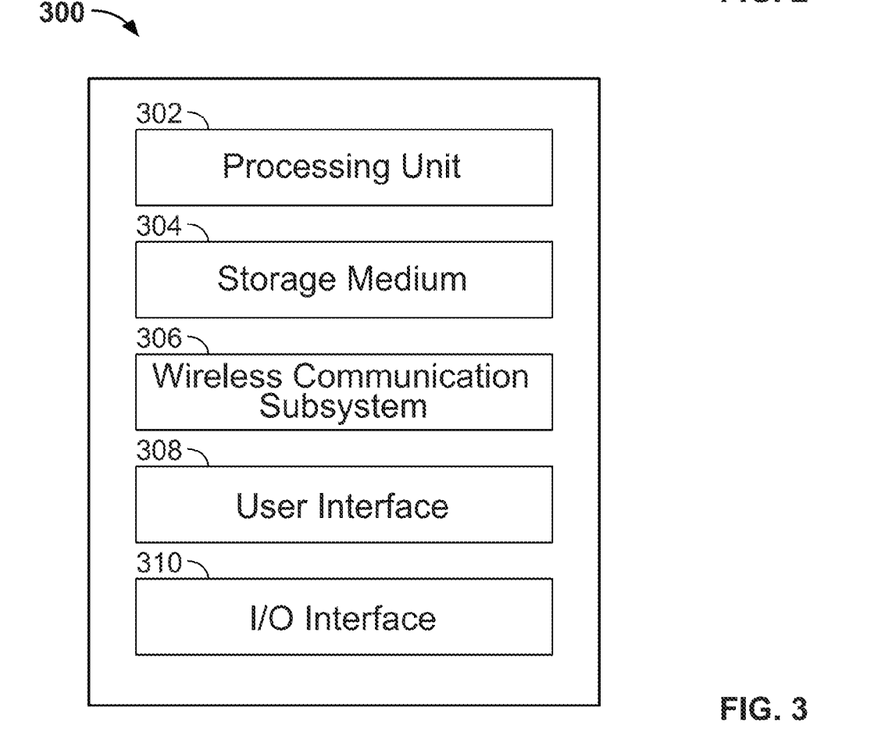
FIG. 3 is a schematic illustrating an example user-equipment device.

FIG. 3 is a schematic illustrating an example UE 300. As mentioned with regard to FIG. 1, the UE 300 may be an example of the UE 110*a* or 110*b*. In some instances, the UE 300 can communicate with one or more communication networks that embody different communication standards or protocols. For example, the UE 300 may communicate with both an LTE network and a WLAN network. The example UE 300 includes a processing unit 302, a computer readable storage medium 304 (for example, ROM or flash memory), a wireless communication subsystem 306, an interface 308, and an I/O interface 310. Similar to the processing module 202 of FIG. 2, the processing unit 302 can include one or more processing components (alternatively referred to as "processors" or "central processing units" (CPUs)) configured to execute instructions related to one or more of the processes, steps, or actions described above in connection with one or more of the implementations disclosed herein (for example, operations described with respect to FIG. 4). The wireless communication subsystem 306 may be configured to provide wireless communications for data information or control information provided by the processing unit 302. The wireless communication subsystem 306 can include, for example, one or more antennas, a receiver, a transmitter, a local oscillator, a mixer, and a digital signal processing (DSP) unit. In some embodiments, the wireless communication subsystem 306 can support advanced multi-user detection (MUD) receivers and multiple input multiple output (MIMO) transmissions.

In some implementations, the wireless communication subsystem 306 can include multiple subsystems. As an example, the wireless communication subsystem 306 can include an LTE subsystem and a WLAN subsystem that support communications based on LTE and WLAN standards, respectively. In some implementations, each of the subsystem can include, for example, a receiver, a transmitter, or any other appropriate components. The transmitter can include any appropriate processor, memory, or other circuitry for performing data transmission while the receiver can include any appropriate processor, memory, or other circuitry for performing data reception. In some implementations, an LTE subsystem can include an LTE transmitter and an LTE receiver that are configured to transmit and receive data based on the LTE standard. Similarly, a WLAN subsystem can include a WLAN transmitter and a WLAN receiver that are configured to transmit and receive data based on the WLAN standard. In some implementations, the transmitters and receivers can include one or more processors that are operable to perform, for example, operations described with respect to FIG. 4, in addition to or as an alternative to operations specified by the LTE, WLAN, or other standards or protocols.

The interface 308 can include, for example, one or more of a screen or touch screen (for example, a liquid crystal display (LCD), a light emitting display (LED), an organic light emitting display (OLED), a microelectromechanical system (MEMS) display), a keyboard or keypad, a trackball, a speaker, and a microphone. The I/O interface 310 can include, for example, a universal serial bus (USB) interface. A skilled artisan will readily appreciate that various other components can also be included in the example UE device 300.

Figure 4:
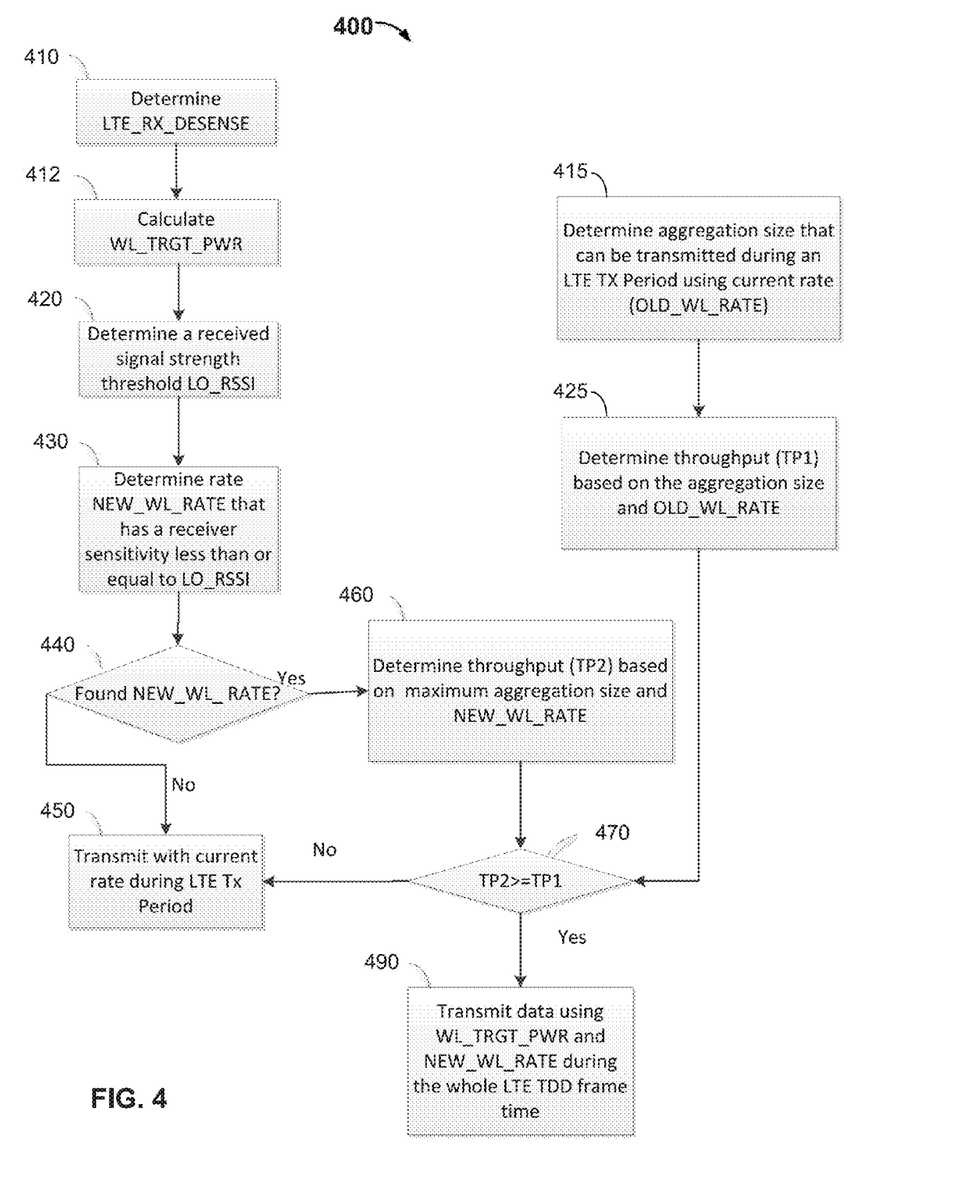
FIG. 4 is a flowchart illustrating an example process for transmission power and rate control of a WLAN transmitter.

FIG. 4 is a flowchart illustrating an example process 400 for transmission power and rate control of a WLAN transmitter. In some implementations, the example process 400 can be performed, for example, by the WLAN transmitter, to allow concurrent operations of LTE and WLAN transceivers and to mitigate interference from the WLAN transmission to an LTE receiver. The WLAN transmitter can be a transmitter that is capable of data transmission based on a WLAN standard or protocol. The WLAN transmitter can be located within or associated with user equipment, a network node. For example, the WLAN transmitter can be the transmitter of the WLAN transceiver 115 of the UE 110*b*, or it can be a transmitter within the AP 125 of the WLAN network 130 in FIG. 1.

In some implementations, the example process 400 shown in FIG. 4 can be modified or reconfigured to include additional, fewer, or different operations, which can be performed in the order shown or in a different order. In some instances, one or more of the operations can be repeated or iterated, for example, until a terminating condition is reached. In some implementations, one or more of the individual operations shown in FIG. 4 can be executed as multiple separate operations, or one or more subsets of the operations shown in FIG. 4 can be combined and executed as a single operation.

At step 410, an LTE RX de-sense value is determined. The LTE RX de-sense can be a function of the operating WLAN channel, the operating LTE channel, the WLAN TX power, and any other appropriate parameters. In some implementations, the LTE_RX_desense value can be a known quantity that is characterized offline and stored in an ini or config file, or in another format. Given the operating conditions (e.g., operating channels, TX power), the LTE RX de-sense value can be identified, for example, by looking up in the ini or config file or another source. In some other implementations, the LTE RX de-sense value can be calculated or updated online during the operation of the WLAN receiver.

In some instances, the LTE RX de-sense value reacts linearly to WLAN TX power reduction. For example, a 1 dB reduction in WLAN TX power can result in 1 dB decrease in the LTE RX de-sense value. In some implementations, a lookup table or a function may be used to capture the relationship between the LTE RX de-sense value and the WLAN TX power reduction.

At step 412, the WLAN TX power (e.g., WL_TRGT_PWR) can be determined. As an example, the WLAN TX power can be determined based on the LTE RX de-sense value according to Equation (1):

$$WL\_TRGT\_PWR = WL\_CURRENT\_PWR - LTE\_RX\_DESNSE \qquad (1).$$

The WL_TRGT_PWR can represent the target or desired TX power of the WLAN transmitter such that concurrent operations of the LTE and WLAN transceivers are allowed without LTE receiver de-sensing. The WL_CURRENT_PWR can represent another (or a current) TX power without concurrent LTE and WLAN operations. In some instances, the WLAN TX power and the LTE RX de-sense value may be related in another manner than the Equation (1). In some instances, the reduced WL_TRGT_PWR can cause a reduced SINR in the UL direction at a remote WLAN receiver. In the example shown in FIG. 1, when the WLAN transceiver 115 of the UE 110*b* is transmitting data in the UL direction (e.g., from the UE 110*b* to the AP 125) using a reduced TX power, the received SINR at the AP 125 may be decreased.

At step 420, a received signal strength threshold can be calculated. For example, the received signal strength threshold can be a low signal strength threshold that indicates a minimum required received signal strength at a WLAN receiver. In some instances, the received signal strength threshold can be represented by LO_RSSI (low received signal strength indicator). In some implementations, the WLAN receivers at both ends of the uplink and downlink can have symmetric receiver sensitivity. The LO_RSSI can be calculated, for example, according to Equation (2).

$$LO\_RSSI = REG\_RSSI - LTE\_RX\_DESNSE \qquad (2).$$

The REG_RSSI (regular received signal strength indicator) can represent received signal strength at the WLAN receiver during regular operations without concurrent LTE and WLAN operations. For instance, the REG_RSSI may be the received signal strength measured at a WLAN receiver when the corresponding WLAN transmitter is transmitting using WL_CURRENT_PWR. The RSSI can be symmetric at both ends of the link. In some cases, if the RSSI is not symmetric at both ends of the link, a lower bound of the REG_RSSI can be used as the REG_RSSI in Equation (2). The lower bound of the REG_RSSI can be, for example, a corresponding WLAN receiver sensitivity when the WLAN transmitter is transmitting using WL_CURRENT_PWR, or another lower bound. In some implementations, additional or different approaches can be used to determine the received signal strength threshold LO_RSSI based on the LTE_RX_DESENSE value.

At step 430, a transmission rate of the WLAN transmitter is determined. In some instances, the transmission rate can be used to accommodate the TX power reduction and to allow for concurrent LTE and WLAN operations. In some implementations, the transmission rate can be referred to as a new transmission rate (i.e., NEW_WL_RATE), compared with an old or current transmission rate (i.e., OLD_WL_RATE) used when the WLAN transmitter does not perform concurrent LTE and WLAN operations. The NEW_WL_RATE can be determined so that it requires a receiver sensitivity less than or equal to the LO_RSSI determined at step 420. In some instances, a highest transmission rate with required receiver sensitivity less than the LO_RSSI can be selected as the NEW_WL_RATE. In some implementations, a look-up table or a function that maps a transmission rate and required receiver sensitivity can be pre-computed, stored or otherwise made available to the WLAN transmitter. The NEW_WL_RATE may be looked up, computed, updated, or otherwise determined based on the received signal strength threshold LO_RSSI.

In some implementations, an aggressive approach can choose, for example, the highest rate where the required receiver sensitivity based on LO_RSSI where the LO_RSSI is determined according to Equation (2) with REG_RSSI being the received signal strength measured at a WLAN receiver when the corresponding WLAN transmitter is transmitting using WL_CURRENT_PWR. In some other implementations, a conservative approach can choose, for example, the highest rate where the required receiver sensitivity less than LO_RSSI according to Equation (2) with REG_RSSI being a corresponding WLAN receiver sensitivity when the WLAN transmitter is transmitting using WL_CURRENT_PWR. Additional or different factors can be taken into account in determining the NEW_WL_RATE.

At step 440, whether a new transmission rate is found can be determined. In some instances, for example, the LO_RSSI (e.g., due TX power reduction) may be so low that no viable transmission rate can be supported. In this case, no NEW_WL_RATE is found. Upon such a determination, the WLAN transmitter may, at step 450, transmit with the current or old rate (OLD_WL_RATE) during the LTE TX period (e.g., during LTE UL frame duration) but not during the LTE RX period. Otherwise, if a NEW_WL_RATE is found, a throughput comparison (between using NEW_WL_RATE and OLD_WL_RATE) can be performed at step 470 to decide what transmission rate to be used.

At step 415, a frame aggregation size can be determined based on a current transmission rate (e.g., OLD_WL_RATE). The OLD_WL_RATE can be the transmission rate of the WLAN transmitter without concurrent LTE and WLAN operations, the transmission rate when the WLAN transmitter is transmitting using WL_CURRENT_PWR, or another transmission rate. In some implementations, the WLAN transceiver can support, for example, IEEE 802.11n and 802.11ac that allows frame aggregation. (It is understood that IEEE 802.11ac operates in 6 GHz, but if intermodulation or other non-direct interference with a TDD radio occurs, then the example techniques can be applicable.) In WLAN and LTE coexistence scenarios, with extended LTE DL durations or frequent UL/DL transitions, the use of WLAN frame aggregation can be inhibited. Therefore, it may be doubly advantageous to operate continuously at lower rates (e.g., using NEW_WL_RATE) rather than operating intermittently at higher rates (e.g., using NEW_WL_RATE).

Table 2 shows example LTE TDD frame configurations with the corresponding UL/DL duty cycles. The LTE TDD frame configuration can be set by the eNB. It can be a known quantity and may not change frequently. The WLAN transceiver can receive the LTE TDD frame configuration information (e.g., the uplink-downlink configuration index as shown in the first column of Table 2), for example, via the interfaces (e.g., interfaces 116 in FIG. 1) between the LTE transceiver and the WLAN transceiver. In some instances, the LTE TDD frame configuration can be exchanged over the BT-Sig 2 interface, rather than relying on the 3-wire (e.g., LTE_TX, LTE_RX, WLAN_PRIO) interfaces.

TABLE 2

LTE TDD frame configurations

| UPLINK-DOWN-LINK CONFIG-URATION | DOWN-LINK TO UPLINK SWITCH PERIO-DICITY | 0 | 1 | 2 | 3 | 4 | 5 | 6 | 7 | 8 | 9 |
|---|---|---|---|---|---|---|---|---|---|---|---|
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

D is a subframe for downlink transmission
S is a "special" subframe used for a guard time
U is a subframe for uplink transmission In some implementations, based on the LTE TDD frame configuration, a maximum aggregation size for the OLD_WL_RATE can be determined. For example, the maximum aggregation size can be determined such that an aggregated WLAN frame of the maximum aggregation size fit within the LTE TX period (e.g., the LTE UL frame duration). In some instances, the maximum aggregation size can depend on other factor such as the device capabilities (e.g., available buffers, transmission load, etc.). The WLAN transmitter can choose an appropriate frame aggregation size less than or equal to the maximum frame aggregation size for data transmission. A frame aggregation size can correspond to certain transmission efficiency, which can further determine a transmission throughput.

Figure 5:
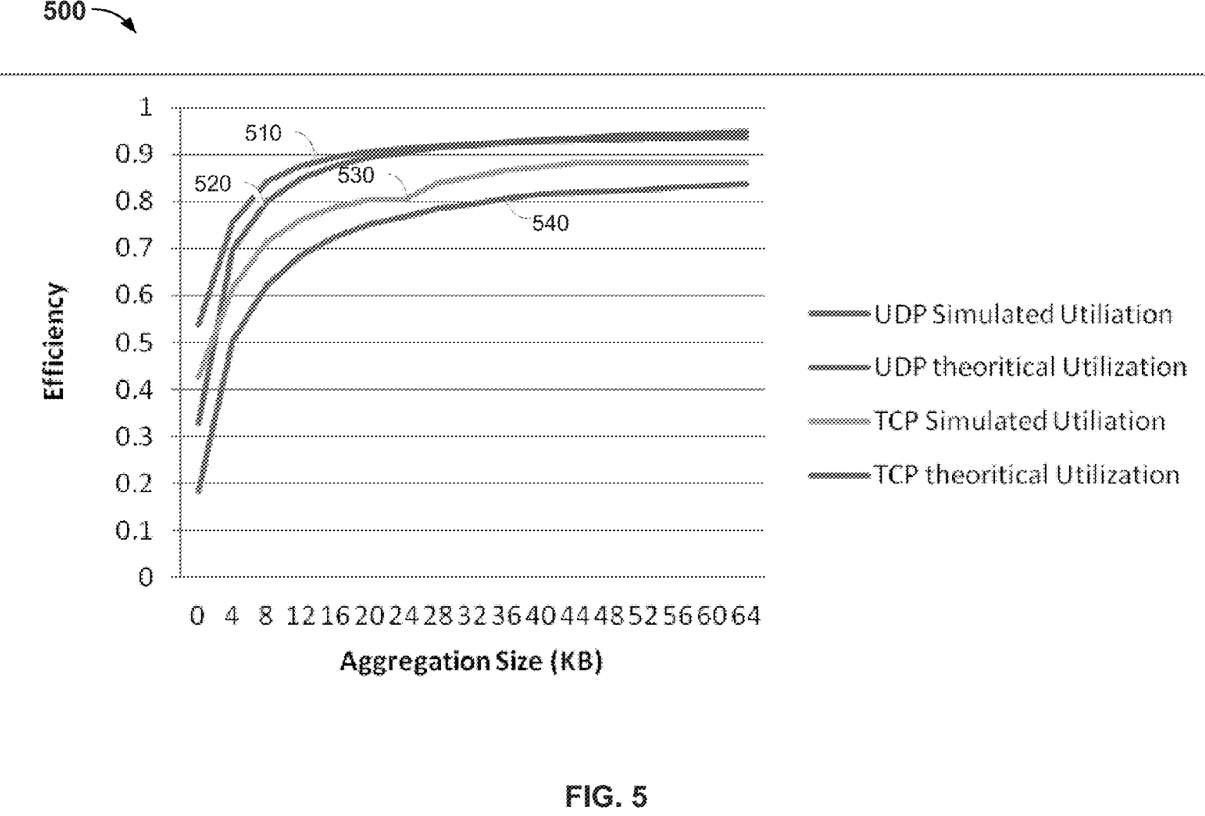
FIG. 5 is a plot illustrating example transmission efficiencies versus different frame aggregation sizes.

FIG. 5 is a plot 500 illustrating example transmission efficiencies versus different aggregation sizes. Specifically, curves 510 and 520 represent example simulation and theoretical UDP utilizations, while curves 530 and 540 represent example simulation and theoretical TCP utilizations with respect to the different frame aggregation size as shown on the x-axis. Given a frame aggregation size, a corresponding efficiency or utilization can be determined according to one or more of the utilization curves. For example, given a frame aggregation size of 36, its corresponding transmission efficiency can be determined to be about 80%, according to the TCP theoretical utilization curve 540. Additional or different efficiency curves can be used for determining the transmission efficiency. In some implementations, in addition to or as an alternative to the transmission efficiency or utilization curves, a look-up table, a function, or another algorithm can be used to determine the transmission efficiency given an aggregation size.

At step 425, a throughput (TP1) corresponding to OLD_WL_RATE can be estimated or otherwise determined based on the aggregation size and the corresponding efficiency. For example, the throughput TP1 can be estimated based on Equation (3):

$$TP1 = OLD\_WL\_RATE \times Efficiency \quad (3).$$

The throughput can take into consideration other factors and may be determined in another manner based on the aggregation size and the efficiency.

At step 460, a throughput (TP2) corresponding to NEW_WL_RATE can be estimated or otherwise determined. The TP2 can be determined similarly to the TP1, or it can be determined in a different manner. For example, the throughput TP1 can be estimated based on Equation (4):

$$TP2 = NEW\_WL\_RATE \times Efficiency \quad (4).$$

Here, the efficiency corresponds to the efficiency using NEW_WL_RATE. The efficiency can be determined, for example, based on a frame aggregation size for NEW_WL_RATE. The efficiency can be determined based on the example techniques described for determining the efficiency using OLD_WL_RATE (e.g., according to an efficiency curve, function, look-up table, etc.), or another technique. In some instances, to determine the efficiency using NEW_WL_RATE, the maximum frame aggregation size for NEW_WL_RATE needs to be determined. In some implementations, the maximum frame aggregation size for the OLD_WL_RATE can be used as the maximum frame aggregation size for the NEW_WL_RATE, or the maximum frame aggregation size for the OLD_WL_RATE can be modified (e.g., adding/subtracting a constant, multiplying a scalar, etc.) to determine the maximum frame aggregation size for the NEW_WL_RATE.

In some implementations, the maximum frame aggregation size for NEW_WL_RATE can be determined based on the LTE TDD frame configuration and the NEW_WL_RATE. For instance, the maximum frame aggregation size for the NEW_WL_RATE can be determined such that the aggregated WLAN frame can be transmitted during the whole LTE TDD frame time using the NEW_WL_RATE, thus allowing concurrent LTE and WLAN operations. The maximum frame aggregation size for the NEW_WL_RATE can depend on other factors such as device capabilities. In some implementations for NEW_WL_RATE, the maximum allowable aggregation size can be used to identify the corresponding efficiency and then estimate or otherwise determine the throughput TP2 for the NEW_WL_RATE.

At step 470, the throughput TP2 for the NEW_WL_RATE and the throughput TP1 for the OLD_WL_RATE can be compared. In some instances, if TP2 is less than TP1, the WLAN transmitter can continue to transmit using the OLD_WL_RATE during LTE_TX period as indicated by step 450. On the other hand, if TP2 is larger than or equal to TP1, the WLAN transmitter can adopt the NEW_WL_RATE for data transmission.

At step 490, data can be transmitted using the WL_TRGT_PWR and NEW_WL_RATE during the whole LTE TDD frame time. In this case, in addition to transmitting during LTE TX period (e.g., one or more LTE UL subframes), the WLAN transmitter can also transmit during LTE RX period (e.g., one or more LTE DL subframes), and thus achieving concurrent operations of the WLAN transceiver and LTE transceiver.

While several implementations have been provided in the present disclosure, it should be understood that the disclosed systems and methods may be embodied in many other specific forms without departing from the scope of the present disclosure. The present examples are to be considered as illustrative and not restrictive, and the intention is not to be limited to the details given herein. For example, the various elements or components may be combined or integrated in another system or certain features may be omitted, or not implemented.

Also, techniques, systems, subsystems and methods described and illustrated in the various implementations as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

While the above detailed description has shown, described, and pointed out the fundamental novel features of the disclosure as applied to various implementations, it will be understood that various omissions and substitutions and changes in the form and details of the system illustrated may be made by those skilled in the art, without departing from the intent of the disclosure. In addition, the order of method steps are not implied by the order they appear in the claims.

What is claimed is:

1. A method performed at a wireless local area network (WLAN) transmitter of a communication system in response to interference with a long term evolution (LTE) receiver, the method comprising:
    determining a WLAN frame aggregation size based on a transmission rate for the WLAN transmitter and an LTE frame configuration for the LTE receiver;
    determining a throughput based on the transmission rate and the WLAN frame aggregation size;
    determining the throughput is greater than a throughput for a current transmission rate and a current frame size; and
    in response to determining the throughput is greater, transmitting data during a downlink receiving period of the LTE receiver using the transmission rate and the WLAN frame aggregation size.

2. The method of claim 1, wherein the LTE frame configuration comprises an LTE time division duplex (TDD) frame configuration and transmitting data comprises transmitting data during an entire LTE TDD frame of the LTE receiver using the transmission rate and the WLAN frame aggregation size.

3. The method of claim 1, wherein the LTE frame configuration for the LTE receiver is received over an interface between the WLAN transmitter and the LTE receiver.

4. The method of claim 1, wherein the transmission rate is a first transmission rate and the WLAN frame aggregation size is a first frame size, the method comprising:
   determining a first efficiency based on the first frame size;
   determining a first throughput based on the first transmission rate and the first efficiency;
   determining a second frame size based on a second transmission rate and the LTE frame configuration for the LTE receiver;
   determining a second efficiency based on the second frame size;
   determining a second throughput based on the second transmission rate and the second efficiency; and
   wherein the WLAN transmitter is configured to transmit data during the downlink receiving period of the LTE receiver using the first transmission rate and the first frame size only if the first throughput is larger than the second throughput.

5. The method of claim 4, wherein determining the second frame size comprise determining a maximum frame size that can be transmitted during an LTE uplink transmission period using the second transmission rate.

6. The method of claim 4, wherein determining the first frame size comprise determining a maximum frame size that can be transmitted during an entire LTE TDD frame time using the first transmission rate.

7. An apparatus of a communication network, comprising:
   a long term evolution (LTE) receiver; and
   a wireless local area network (WLAN) transmitter, the WLAN transmitter configured to:
     determine a WLAN frame aggregation size based on a transmission rate for the WLAN transmitter and an LTE frame configuration for the LTE receiver;
     determine a throughput based on the transmission rate and the WLAN frame aggregation size;
     determine the throughput is greater than a throughput for a current transmission rate and a current frame size; and
     in response to determining the throughput is greater, transmit data during a downlink receiving period of the LTE receiver using the transmission rate and the WLAN frame aggregation size.

8. The apparatus of claim 7, wherein the LTE frame configuration comprises an LTE time division duplex (TDD) frame configuration and the WLAN transmitter is configured to transmit data during an entire LTE TDD frame of the LTE receiver using the transmission rate and the WLAN frame aggregation size.

9. The apparatus of claim 7, wherein the transmission rate is a first transmission rate and the WLAN frame aggregation size is a first frame size, and the WLAN transmitter is configured to:
   determine a first efficiency based on the first frame size;
   determine a first throughput based on the first transmission rate and the first efficiency;
   determine a second frame size based on a second transmission rate and the LTE frame configuration for the LTE receiver;
   determine a second efficiency based on the second frame size;
   determine a second throughput based on the second transmission rate and the second efficiency; and
   wherein the WLAN transmitter is configured to transmit data during the downlink receiving period of the LTE receiver using the first transmission rate and the first frame size only if the first throughput is larger than the second throughput.

10. The apparatus of claim 7, wherein the WLAN transmitter is configured to receive the LTE frame configuration over an interface between the WLAN transmitter and the LTE receiver.

11. A non-transitory computer-readable medium storing instructions that are operable when executed by data processing apparatus to perform operations at a first wireless device in response to interference with a long term evolution (LTE) receiver, the operations comprising:
   determining a WLAN frame aggregation size based on a transmission rate for the WLAN transmitter and an LTE frame configuration for the LTE receiver;
   determining a throughput based on the transmission rate and the WLAN frame aggregation size;
   determining the throughput is greater than a throughput for a current transmission rate and a current frame size; and
   in response to determining the throughput is greater, transmitting data during a downlink receiving period of the LTE receiver using the transmission rate and the WLAN frame aggregation size.

12. The computer-readable medium of claim 11, wherein the LTE frame configuration comprises an LTE time division duplex (TDD) frame configuration and transmitting data comprises transmitting data during an entire LTE TDD frame of the LTE receiver using the transmission rate and the WLAN frame aggregation size.

13. The computer-readable medium of claim 11, wherein the transmission rate is a first transmission rate and the WLAN frame aggregation size is a first frame size, the operations comprising:
   determining a first efficiency based on the first frame size;
   determining a first throughput based on the first transmission rate and the first efficiency;
   determining a second frame size based on a second transmission rate and the LTE frame configuration for the LTE receiver;
   determining a second efficiency based on the second frame size;
   determining a second throughput based on the second transmission rate and the second efficiency; and
   wherein the WLAN transmitter is configured to transmit data during the downlink receiving period of the LTE receiver using the first transmission rate and the first frame size only if the first throughput is larger than the second throughput.

14. The computer-readable medium of claim 13, wherein determining the first frame size comprise determining a maximum frame size that can be transmitted during an entire LTE TDD frame time using the first transmission rate.

* * * * *